No. 719,762. PATENTED FEB. 3, 1903.
A. F. DEMORY.
PETROLEUM OIL BURNER.
APPLICATION FILED MAY 13, 1902.
NO MODEL. 2 SHEETS—SHEET 1.
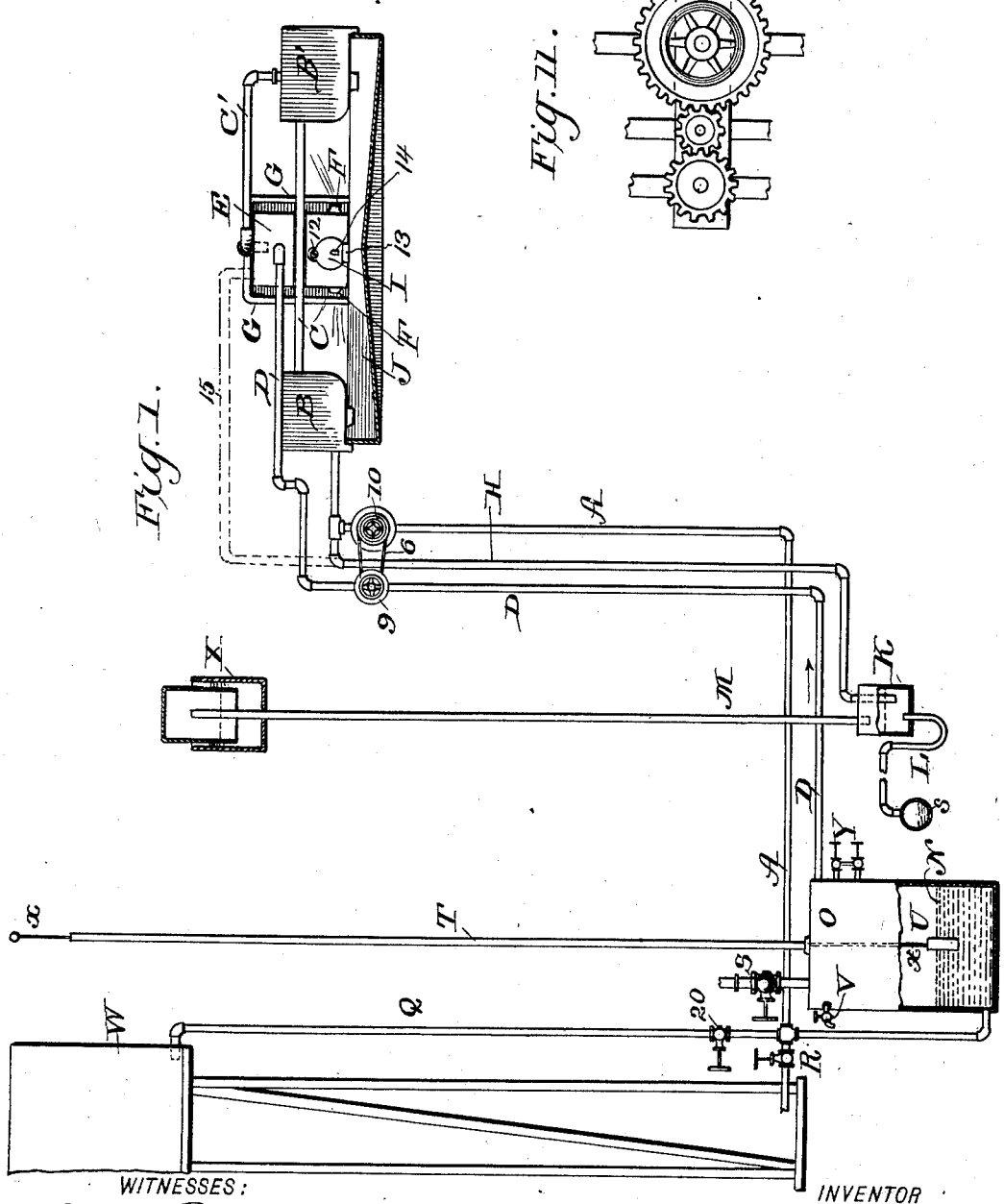
WITNESSES:
Jos. A. Ryan
Edw. W. Byrn
INVENTOR
Alexander F. Demory
BY Munn & Co.
ATTORNEYS No. 719,762. PATENTED FEB. 3, 1903.
A. F. DEMORY.
PETROLEUM OIL BURNER.
APPLICATION FILED MAY 13, 1902.
NO MODEL. 2 SHEETS—SHEET 2.
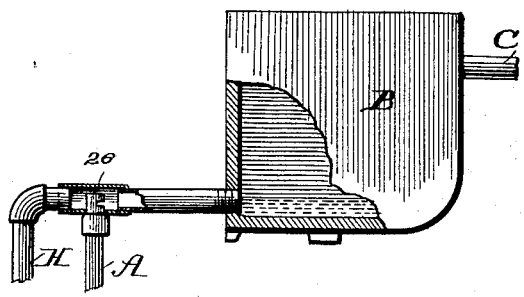
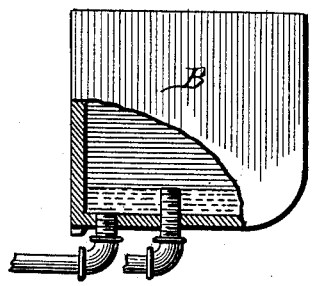
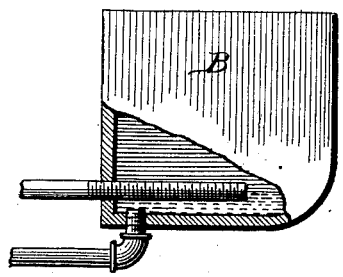
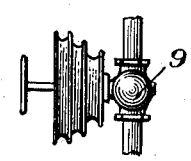
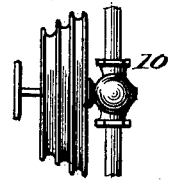
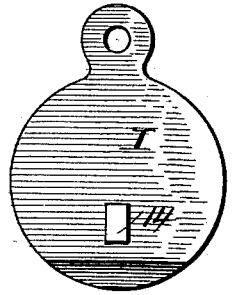
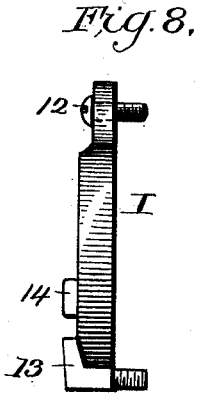
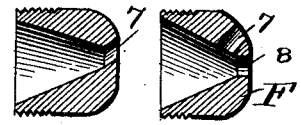
WITNESSES:
Jos. A. Ryan
Edw. W. Byrn
INVENTOR
Alexander F. Demory
BY Munn & Co.
ATTORNEYS

UNITED STATES PATENT OFFICE.

ALEXANDER F. DEMORY, OF NACOGDOCHES, TEXAS, ASSIGNOR OF ONE-HALF TO WILLIAM G. BARRON, OF NACOGDOCHES, TEXAS.

PETROLEUM-OIL BURNER.

SPECIFICATION forming part of Letters Patent No. 719,762, dated February 3, 1903.

Application filed May 13, 1902. Serial No. 107,074. (No model.)

*To all whom it may concern:*

Be it known that I, ALEXANDER F. DEMORY, of Nacogdoches, in the county of Nacogdoches and State of Texas, have invented a new and useful Improvement in Petroleum-Oil Burners, of which the following is a specification.

My invention is in the nature of a novel construction and arrangement of burner for utilizing crude petroleum for the purpose of furnishing heat, power, and light for the use of heating and cooking stoves, bake-ovens, furnaces for hot air, steam, or water, the boilers of locomotives and ships, and various other uses for which it may be applicable.

It consists in a comparatively small and simple burner which is easily portable and which, with various accessories for regulating the supply and discharge, operates upon the principle of generating steam in one chamber and then passing it to another, in which it is superheated, and thence into another chamber, to which the oil is fed and in which the steam and heated oil are mixed and heated to form a combustible gas, which then issuing through nozzles under the steam-pressure is immediately ignited and burned to furnish heat for any of the purposes named and at the same time the necessary heat to continue the operation by generating more steam and heat fresh accessions of oil in a continuous manner. Traps are employed to control the water-level and to give relief also as against explosion and for the removal of surplus water and gas, separating the water and sending it to the sewer, and saving the gas in a gasometer for lighting purposes, the oil-tank to be placed underground or at any suitable low level and to be fed by hydraulic pressure, all as hereinafter more fully described with reference to the drawings, in which—

Figure 1 is a side elevation of my burner shown applied to the supply-pipe tanks, valves, traps, and other accessories of my system; and Figs. 2 to 11 are details.

The burner proper, which is to be inserted in the fire-box of a furnace or at other point of utilization, consists of the cast-iron chamber B, in which steam is generated and which I term the "primary" steam-chamber, a second cast-iron chamber B', in which the steam is superheated, an intermediate cast-iron chamber E, in which the steam and oil are mixed, nozzles F F, from which the combustible gas issues and is burned, and a guard plate or hood G to protect the mixer against the excessive heat of the blast in the fire-box. (Not shown.) The chambers above named are connected by pipes, as shown, and the jets of burning gas issuing from the nozzles F F are directed outwardly on both sides of the mixer against the steam-chambers B and B' and also upwardly against the pipes and mixer-chamber.

A is a water-supply pipe to chamber B, where water is converted into steam, which passes through pipe C into superheating-chamber B' and on through pipe C' into oil-mixing chamber E.

D is an oil-supply pipe extending to mixing chamber E where the oil is converted into gas and forced out through the nozzles F F with the steam coming from the pipes C C' forming a combustible gas which is burned and the blaze heating chambers B B' converts the fresh accessions of water into steam. In Fig. 9, 7 shows the angle of top hole in each nozzle F, which holes throw the blaze upward, while holes at 8 throw the blaze against chambers B B'. These nozzles are also made with only one hole in each, directed upwardly somewhat, as seen in Fig. 10. The supply of water, steam, and oil to chambers B and E is controlled by valves 9 and 10, which regulate the proper amount of water and oil by the use of grooved cone-pulleys (see Figs. 5 and 6) and a belt of wire cable or cord 6, passing around same, as shown in Fig 1, or by means of gear-wheels, as shown in Fig. 11, as may be required.

H is a gas and safety and overflow pipe, which is connected to chamber B, as shown in Figs. 1 and 2. The pipe H is to enter chamber B at any point desired in a manner so that the water passing through A into chamber B will fill the chamber B to the depth of about three-eighths of an inch or more, as may be required, and then flow out through the pipe H. For this purpose a nipple, as shown at 26, in the pipe-fitting (see Fig. 2) has a small hole in the side next to the burner and at the bottom side of pipe through which the water from pipe A passes into chamber B, and when the water is about three-eighths of an inch deep or more it will flow back out over the top end of nipple 26 and out through pipe H. Instead of this arrangement of nipple 26 the water-pipe A and the outflow-pipe H may have separate connections with the chamber B at different levels, as seen in Figs. 3 and 4. Pipe H is used to convey water and gas not consumed in the burner into a trap-chamber K, Fig. 1, and the end of pipe H being submerged in water the gas will rise through the water and pass out through stand-pipe M into a gasometer X or storage-tank for gas, and the surplus or overflow of water will pass out through iron pipe L into the sewer *s* or onto the ground, as may be required.

The pressure in the burner is regulated by means of the traps K and L, which will prevent an explosion in the burner and also regulate the fire.

O is an oil-tank, showing at S a valved inlet for filling the tank with oil.

W is a water-tank placed above the level of the burner.

Q is a water-pipe through which water passes into the bottom of tank O, and the pressure of this water forces the oil out through pipe D into chamber E. Water-pipe A is connected with water-pipe Q from tank W and conveys water into chamber B. When the oil-tank is to be filled, a valve 20 in the water-pipe Q will be closed and a valve R is opened, through which the water from oil-tank O will flow out onto the ground or into sewer as the oil enters at S.

U is a float to which wire *x* is attached, which passes up through pipe T to the top end. The float U will float in water and sink in oil, and as the oil is consumed the water raises the float, and the wire extending through pipe T will indicate the amount of oil in tank.

N represents the water-line in the tank O and showing the position of the float between the water and oil.

V is a drain-valve near the top of oil-tank, and Y is a glass gage to be used to ascertain when the oil is above the points where they are placed in the side of the tank.

Mixing-chamber E may have a pipe connection on top, or it can be near the top on the side for connecting with a pipe to convey gas out into the pipe H. By thus connecting such outlet-pipe to pipe H, as shown in dotted lines at 15, or at any convenient point the gas may be conveyed directly into trap-chamber K. The chambers B B' have lugs on their bottom sides, which are fitted into notches in the end of a pan J to hold the same in place.

The mixing-chamber E has an opening or hole between the nozzles F F, covered or stopped with a plug or cap I. The cap I is for the purpose of uncovering this hole if at any time it is necessary to clean the inside of chamber E. 12 is a screw-bolt for fastening cap I to chamber E, as seen in Figs. 7 and 8.

13 shows a flanged clamp for holding the cap closed to make a tight joint.

14 is a projection on the surface of the cap for the purpose of pushing or knocking same from over the hole in chamber E.

G G is a housing or covering for chamber E, which is to protect said chamber from the heat when a very hot fire is required.

J is a drip-pan to catch any oil that may fall from nozzles F F.

In simplifying my invention for some uses I may dispense with the superheating-chamber B' and pipe C' and run the pipe C direct from the chamber B to the mixing-chamber E. In such case the nozzle F on the side next to chamber B' may be dispensed with.

Having thus described my invention, what I claim as new, and desire to secure by Letters Patent, is—

1. An oil-burner comprising two steam-chambers, one to receive the water and convert it into steam and the other to superheat the steam, both being connected by a pipe and an intermediate mixing and heating chamber for steam and oil placed between the two steam-chambers and connected respectively to an oil-supply pipe and to the superheated steam-chamber, and having at its lower part oppositely-directed burner-nozzles pointing toward the two steam-chambers substantially as described.

2. In an oil-burner, the combination of two steam-chambers and an intermediate mixing and heating chamber for oil and steam connected by pipes as described, the mixing-chamber being provided with burner-nozzles, and the primary steam-chamber having a trap and overflow for the backflow of water and unconsumed gas substantially as and for the purpose described.

3. In an oil-burner, the combination of two steam-chambers and an intermediate mixing and heating chamber for oil and steam connected by pipes as described, the mixing-chamber being provided with burner-nozzles, and the primary steam-chamber having a trap for the backflow of water and unconsumed gas, an outflow-pipe for said water and gas, and a second subjacent trap for separating the backflow water and gas from each other substantially as described.

4. An oil-burner comprising a steam-generating chamber and an oil and steam mixing chamber, water and oil pipes leading respectively to these chambers, the valves for the pipes bearing on their stems reversed cone-pulleys, and a belt connecting said cone-pulleys for a simultaneous and variable adjustment of the valves to regulate the relative proportions of water and oil as described.

5. In an oil-burner, the steam-generating chamber, having an inlet feed-pipe for water and an outflow-pipe for surplus water, the two pipes having a common connection at the point of entrance to the steam-chamber, and having also at the confluence of the two pipes a standing nipple having an inflow-orifice from the water-pipe and an outflow-orifice for the overflow, the latter being at a higher level than the former to maintain a definite and constant level of water in the steam-chamber substantially as described.

6. A crude-oil burner comprising an elevated water-tank with pipe and valve, a subjacent oil-tank having its bottom portion connected with the water-pipe and having at the top an oil-inlet and also an oil-feed pipe with level-indicator for feeding oil by hydraulic pressure, a burner comprising a primary steam-chamber connected to the water-supply, a superheating steam-chamber connected to the primary chamber, an oil and steam mixing chamber, placed between the two steam-chambers and having oppositely-directed burner-nozzles and connected respectively to the oil-supply pipe and the steam-pipe, an overflow-pipe for regulating the level of water in the primary steam-chamber, and a subjacent trap connected thereto and arranged to seal the overflow-pipe and separate the backflow water from the gas and seal the burner against admission of air substantially as shown and described.

ALEXANDER F. DEMORY.

Witnesses:
BEN N. TUCKER,
E. A. BLOUNT.